United States Patent Office 3,242,215
Patented Mar. 22, 1966

3,242,215
BIS-(2-CHLOROACRYLOYL) ARYL COMPOUNDS
Richard F. Heitmiller, Wilmington, Del., assignor to E. I. du Pont de Nemours and Company, Wilmington, Del., a corporation of Delaware
No Drawing. Filed Apr. 4, 1960, Ser. No. 19,483
3 Claims. (Cl. 260—592)

This invention relates to novel organic compounds. More particularly, this invention relates to novel vinyl ketones useful as reaction intermediates, especially as polymer-forming reactants, and to the method for preparing them.

The search for new classes of synthetic polymers, polymer-forming reactants and the like continues at an ever-increasing pace. Some additional impetus resulted from the discovery of interfacial polymerization (see, e.g., Belgian Patent No. 535,710), whereby diacid chlorides react with difunctional active hydrogen compounds, e.g., diamines, to form in a rapid manner the corresponding polymer. New compounds are continually being sought in order to extend the scope of this versatile reaction. Independently, polymer-forming reactants which retain, subsequent to polymerization, reactive sites or functional groups available for further reaction, e.g., crosslinking, also are being sought.

An object of this invention is to provide new vinyl ketones. Another object is to provide such compounds which exhibit residual reactivity subsequent to the polymerization thereof. Yet another object is a method for preparing such compounds. Other objects will appear hereinafter.

The objects of this invention are accomplished by providing a compound of the formula $$Ar(-\overset{O}{\underset{\|}{C}}-CH=CHX)_2$$

where Ar is aryl and X is selected from the group consisting of —F, —Cl, —Br, —I, —NH$_2$, —NHR, —OR, —SR and $$-O\overset{O}{\underset{\|}{C}}R$$

R being alkyl, aryl, or aralkyl.

Particularly preferred in this group are compounds having the formulae:

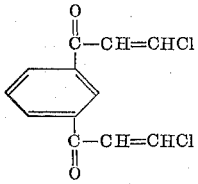

and

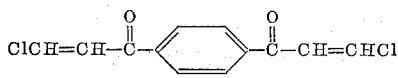

These compounds are readily obtained from the appropriate aroyl diacid halide in ethylene chloride solvent by treatment with acetylene in the presence of an acid catalyst, such as aluminum trichloride.

These compounds may be converted to the others in the group by treatment with an amine to convert X to —NH$_2$ or —NHR, i.e., the vinylog of an amide, by treatment with a salt of an alcohol to convert X to —OR, i.e., the vinylog of an ester, or by treatment with a salt of a carboxylic acid to convert X to $$-O\overset{O}{\underset{\|}{C}}R$$

i.e., the vinylog of an anhydride. The use of salts in many of these subsequent reactions is desirable in order to avoid side reactions. These reactions should be carried out in suitable inert solvents.

The resulting compounds may be utilized to prepare synthetic linear polymeric compositions having recurring units of the formula:

$$Ar(-\overset{O}{\underset{\|}{C}}-CH=CH-)_2$$

Parts and percentages in the following examples are expressed on a weight basis.

*Example I*

A 1-liter resin kettle fitted with an equilibrated dropping funnel, a reflux condenser, a thermometer and a mechanical stirrer is flushed with dry nitrogen and charged with 25 g. (0.123 mole) of isophthaloyl chloride, 32.8 g. (0.25 mole) of anhydrous aluminum chloride, and 400 ml. of ethylene chloride, previously distilled from phosphorous pentoxide. The mixture is heated to reflux over about 20 minutes, then acetylene gas, previously passed through two sulfuric acid traps and a glass wool trap, is admitted. The acetylene addition is bubbled continuously for 6–7 hours while continuing reflux of the reaction mixture. About 0.246 moles of acetylene is added to the isophthaloyl chloride during this time. The resulting black solution is poured with stirring into ice water, the layers separating. The water layer is extracted several times with methylene chloride and the combined organic layers are then dried over anhydrous magnesium sulfate. Solvent removal yields 33 g. of solid residue which, after chromatographic separation on 317 g. of acid-washed alumina, yields 21 g. (67% yield) of bis-1,3-(2-chloroacryloyl)benzene. Recrystallization from cyclohexane gives a pale yellow solid, m. 95–96° C.

*Analysis.*—Calc'd. for C$_{12}$H$_8$O$_2$Cl$_2$: C, 56.5; H, 3.2; Cl, 27.8. Found: C, 56.3; H, 3.4; Cl, 27.4.

The product shows strong carbonyl absorption in the infrared spectrum at 1668 cm.$^{-1}$. The nuclear magnetic resonance (NMR) spectrum shows peaks attributable to olefinic hydrogens.

*Example II*

Employing the apparatus of Example I and a comparable proportion of ingredients, using terephthaloyl chloride as starting material, 5 hours refluxing produces, after purification on alumina, a 40% yield of bis-1,4-(2-chloroacryloyl)benzene, m. 113–117° C. after recrystallization from n-hexane.

*Analysis.*—Calc'd. for C$_{12}$H$_{18}$O$_2$Cl$_2$: C, 56.6; H, 3.2; Cl, 27.8. Found: C, 56.3; H, 3.6; Cl, 27.5.

The product shows strong carbonyl absorption in the infrared spectrum at 1678 cm.$^{-1}$; the NMR spectrum shows peaks attributable to olefinic hydrogen.

*Example III*

A 2.55 g. (0.01 mole) sample of bis-1,3-(2-chloroacryloyl)benzene from Example I is dissolved in 100 ml. of chloroform in a high-speed mixer. A solution of 2.28 g. (0.02 mole) of 2,5-dimethyl piperazine in 100 ml. water is added at room temperature and stirred rapidly for 5 minutes. The reaction then is quenched with 100 ml. of n-hexane, following which 200 ml. of water are added to dissolve any amine salts present. The filtered solid, after drying in a vacuum oven, is obtained in 40% yield, melts at a temperature above 300° C. This material is soluble in hot m-cresol, partially soluble, with swelling, in chloroform. A film is prepared by casting from the chloroform solution.

Preparation of the aryl bis-β-halovinyl ketones of this invention should be carried out in a solvent similar to ethylene chloride, such as trichlorethane, tetrachloroethane and similar alkyl halides. Attempted use of other solvents, such as carbon tetrachloride, has met with less success, although the reasons underlying this behavior are not known. The reaction preferably is undertaken at about the boiling point of the solvent used and at atmospheric pressure. Concentrations are commensurate with solubility of the diacid halide. As little as about 5% by weight of the bis-vinyl ketone of this invention is satisfactory for crosslinking purposes.

In any reaction involving these compounds, particularly reactions taking place at the β carbon atoms, side reactions, such as addition reactions at the carbonyl group or across the ethylene group, should be avoided by excluding materials which catalyze condensation reactions at the carbonyl group. On the other hand, such reactions can be used in a simultaneous or subsequent reaction to produce even further changes in the desired products. Reactions leading to cross-linked material are also possible.

The aryl nucleus may be a disubstituted benzene, naphthalene, biphenyl or other aromatic systems, and may bear in the ring system additional substituents such as lower alkyl (one to five carbon atoms), lower alkoxy, halomethyl (particularly chloromethyl and bromoethyl), dialkylamines (particularly lower alkyl) and similar substituents. No substituent should be provided, however, which impedes the conversion of the aroyl halide to the corresponding vinyl ketone. The aroyl halide groups should be disposed in meta- or para-relationship one to another.

The bis-vinyl ketone compounds of this invention may be homopolymerized or copolymerized with such compounds as di- and/or polyfunctional amines, phenols, and the like, such as hexamethylene diamine, hydroquinone and the like, or may be used as such to provide low levels of modification in an already-formed polymer. For example, when X is —NH₂ or —NHR, the compound will equilibrate under polyamidation conditions with a polyamide, e.g., poly(hexamethylene adipamide), to provide reactive sites in the latter polymer. When X is —OR, the compound will equilibrate under transesterification conditions with a polyester, e.g., poly(ethylene terephthalate), to provide reaction sites in that polymer. The compounds of this invention may also be used as "comonomers" in the otherwise conventional preparation of polyamides, such as poly(hexamethylene adipamide), polycaproamide, poly(m-phenylene isophthalamide) and others as described in U.S. Patents 2,071,250, 2,071,253, 2,130,948 to Carothers and U.S. Patent 2,625,536 to Kirby; polyesters, such as poly(ethylene terephthalate), poly(ethylene isophthalate), poly(trans-p-hexahydroxylene telephthalate), and copolymers thereof; polyurethanes, such as poly(N,N'-tetramethylene ethylene carbamate) and the like.

The compounds of this invention, by virtue of the vinyl group interposed and adjacent the carbonyl and X groups, exhibit a substantial measure of the reactivity of the analogous compounds containing the

grouping. This is a consequence of the so-called principle of vinylogy and permits reaction characteristics of the

group while retaining subsequently the carbonyl and vinyl groups. These retained groups are therefore available as sites for subsequent reaction. Polymers containing adjacent vinyl and carbonyl groups as a part of the polymer structure represent a new class of polymers, polymers are potentially reactive during later processing. These compounds are particularly characterized by their inherent stability and higher melting points, making them highly desirable for the production of fibers and films which retain their good physical characteristics even after exposure to high temperature conditions.

The compounds of this invention are highly versatile materials. The reaction possibilities either in polymer formation or general synthesis are numerous. These compounds are readily obtainable by the process set forth herein. Other advantages inherent in the practice of the invention will occur to those undertaking its practice.

I claim:

1. A composition of matter having the formula:

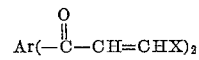

wherein Ar is an aromatic hydrocarbon nucleus and X is selected from the group consisting of halogens and —NH₂.

2. A composition of matter having the formula:

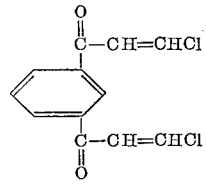

3. A composition of matter having the formula:

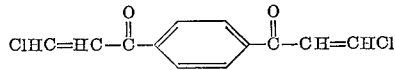

References Cited by the Examiner

UNITED STATES PATENTS

| | | | |
|---|---|---|---|
| 2,125,393 | 8/1938 | Nelles et al. | 260—592 X |
| 2,137,664 | 11/1938 | Bayer et al. | 260—592 |
| 2,195,570 | 4/1940 | Hovey et al. | 260—65 |
| 2,278,635 | 4/1942 | Barnes | 260—63 |
| 2,671,111 | 3/1954 | Butler | 260—592 |
| 2,971,983 | 2/1961 | Henry et al. | 260—592 |

OTHER REFERENCES

Fieser et al., Organic Chemistry, 2nd Ed., pages 81–87 (1950).

McMahon et al., Journal of the American Chemical Society, vol. 70, pages 2971–4 (1948).

LEON ZITVER, *Primary Examiner.*

MILTON STERMAN, *Examiner.*